United States Patent
Nomura et al.

[11] Patent Number: 5,080,065
[45] Date of Patent: Jan. 14, 1992

[54] AIR INTAKE CONTROL SYSTEM FOR AN INTERNAL COMBUSTION ENGINE

[75] Inventors: Yurio Nomura, Nagoya; Tokio Kohama, Nishio; Hiroyuki Aota, Kariya; Toshikazu Ina, Nagoya; Hideki Obayashi, Okazaki, all of Japan

[73] Assignees: Nippondenso Co., Ltd., Kariya; Nippon Soken, Inc., Nishio, both of Japan

[21] Appl. No.: 593,217

[22] Filed: Oct. 4, 1990

[30] Foreign Application Priority Data

Oct. 5, 1989 [JP] Japan ................................. 1-260989
Oct. 12, 1989 [JP] Japan ................................. 1-265647

[51] Int. Cl.⁵ .......................... F02D 9/08; F02B 29/08
[52] U.S. Cl. ................................ 123/403; 123/52 MF; 180/197
[58] Field of Search ............. 123/52 MF, 336, 337, 123/402, 403, 405, 442; 180/197

[56] References Cited

U.S. PATENT DOCUMENTS

| | | | |
|---|---|---|---|
| 4,363,302 | 12/1982 | Pischinger | 123/337 |
| 4,461,151 | 7/1984 | Kanesaka | 60/611 |
| 4,714,063 | 12/1987 | Oda et al. | 123/308 |
| 4,736,814 | 4/1988 | Yogo et al. | 123/352 X |
| 4,796,584 | 1/1989 | Goto et al. | 123/403 |

FOREIGN PATENT DOCUMENTS

| | | |
|---|---|---|
| 0003698 | 8/1979 | European Pat. Off. . |
| 0321931 | 6/1989 | European Pat. Off. . |
| 3810750 | 10/1988 | Fed. Rep. of Germany . |
| 58-214637 | 12/1983 | Japan . |
| 63-65138 | 3/1988 | Japan . |
| 2100886 | 1/1983 | United Kingdom . |
| 2123483 | 2/1984 | United Kingdom . |

Primary Examiner—Tony M. Argenbright
Attorney, Agent, or Firm—Cushman, Darby & Cushman

[57] ABSTRACT

An internal combustion engine has a plurality of cylinders and intake passages leading to the cylinders respectively. A plurality of intake control valves block and unblock the intake passages respectively. Drive devices open and close the intake control valves mutually-independently. A detecting device serves to detect a predetermined condition of the engine under which a speed of the engine is required to vary. A control device performs a control of closing the intake control valves mutually-independently by use of the drive devices after the detecting device detects the predetermined condition of the engine.

25 Claims, 16 Drawing Sheets

FIG. 5

| ENGINE SPEED (rpm) | 800 | 1200 | 1600 | 5200 |
|---|---|---|---|---|
| VALVE OPENING TIMING (CA) | -20 | 0 | 1 | 10 |

FIG. 6

| ENGINE SPEED (rpm) | 800 | 1200 | 1600 | 5200 |
|---|---|---|---|---|
| SMALL PARTIAL LOAD | 60 | 60 | 60 | 60 |
| INTERMEDIATE PARTIAL LOAD | 40 | 37 | 32 | 10 |
| FULL LOAD | 0 | 0 | -2 | -60 |

FIG. 17
| RPM | 800 | ... | ... | ... | 5200 |
|---|---|---|---|---|---|
| TTCBSE | 5 | ... | ... | ... | 10 |
FIG. 18
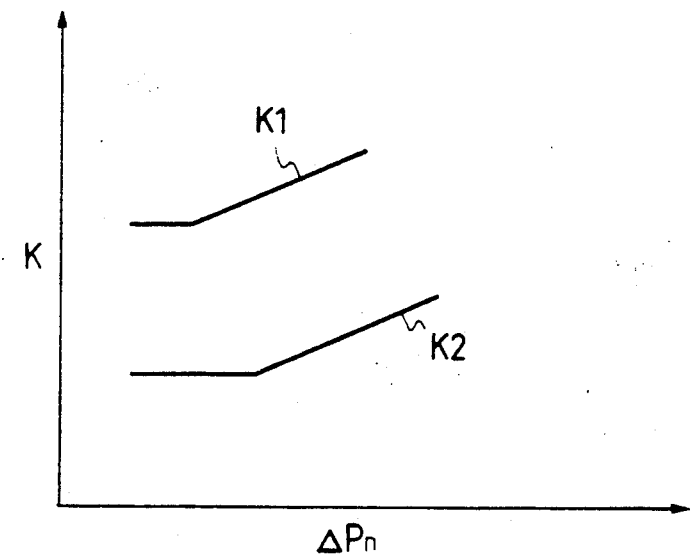
FIG. 19
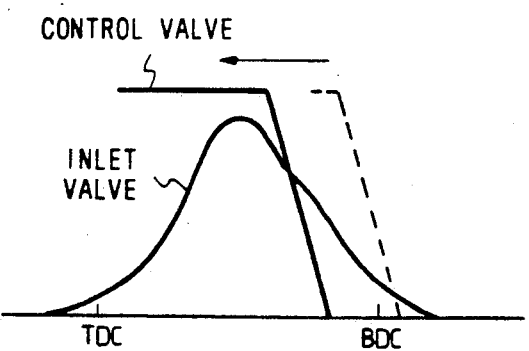

AIR INTAKE CONTROL SYSTEM FOR AN INTERNAL COMBUSTION ENGINE

BACKGROUND OF THE INVENTION

1. Field of the Invention

This invention relates to an air intake control system for a multi-cylinder internal combustion engine which includes intake control valves in addition to general inlet valves, the intake control valves being disposed in intake passages leading to engine cylinders respectively.

2. Description of the Prior Art

In internal combustion engines, during a start of a suction stroke, burned gases tend to flow back to intake passages from cylinders or exhaust passages due to valve overlaps. Such a back flow of burned gas lowers the charging efficiency of the engine. It is known to provide additional valves in intake passages to prevent such a back flow of burned gas.

One of prior art systems includes additional intake control valves in intake passages leading to engine cylinders respectively, and actuators for driving the additional intake control valves respectively. The additional intake control valves are controlled in response to engine operating conditions such as an engine rotational speed and an engine load. The timings of opening and closing the additional intake control valves have equal relations with the operation cycles of the engine cylinders respectively. Therefore, this prior art system can not adequately cope with a case where the engine cylinders are exposed to different air intake conditions respectively, for example, a case where the rates of air flow into the respective cylinders vary from cylinder to cylinder.

Japanese published unexamined patent application 63-65138 discloses an automotive slip control system including additional intake control valves. In the system of Japanese application 63-65138, during acceleration of an automotive vehicle, when a vehicle wheel or wheels slip, the additional intake control valves are activated to control the rates of air flow into respective engine cylinders to reduce the engine power output and thereby to suppress the slip.

SUMMARY OF THE INVENTION

It is an object of this invention to provide an improved air intake control system for an internal combustion engine.

A first aspect of this invention provides an air intake control system for an internal combustion engine having a plurality of cylinders and intake passages leading to the cylinders respectively, the system comprising a plurality of intake control valves for blocking and unblocking the intake passages respectively; drive means for opening and closing the intake control valves mutually-independently; detecting means for detecting a predetermined condition of the engine under which a speed of the engine is required to vary; and control means for performing a control of closing the intake control valves mutually-independently by use of the drive means after the detecting means detects the predetermined condition of the engine.

A second aspect of this invention provides an air intake control system for an internal combustion engine having a plurality of cylinders and intake passages leading to the cylinders respectively, the system comprising a plurality of intake control valves for blocking and unblocking the intake passages respectively; a pressure control valve adjusting a pressure of air flowing to the cylinders via the intake control valves in accordance with an open degree of a valve member; drive means for opening and closing the intake control valves mutually-independently; detecting means for detecting a predetermined condition of the engine under which a speed of the engine is required to vary; and control means for performing a control of closing the intake control valves mutually-independently by use of the drive means after the detecting means detects the predetermined condition of the engine.

A third aspect of this invention provides an air intake control system for an internal combustion engine having a plurality of cylinders and intake passages leading to the cylinders respectively, the system comprising a plurality of intake control valves for blocking and unblocking the intake passages respectively; drive means for opening and closing the intake control valves mutually-independently; a pressure control valve adjusting a pressure of air flowing to the cylinders via the intake control valves in accordance with an open degree of a valve member; means for detecting a slip of a driven wheel; means for varying timings of closing of the intake control valves by the drive means in response to a difference between a target speed and a speed of the driven wheel when the slip detecting means detects the slip; means for detecting which of the cylinders will draw air next when the slip is detected; and means for varying the timings of closing of the intake control valves mutually-independently for the cylinders detected by the cylinder detecting means.

A fourth aspect of this invention provides an air intake control system for an internal combustion engine having a plurality of cylinders and intake passages leading to the cylinders respectively, the system comprising a plurality of intake control valves for blocking and unblocking the intake passages respectively; drive means for opening and closing the intake control valves mutually-independently; a pressure control valve adjusting a pressure of air flowing to the cylinders via the intake control valves in accordance with an open degree of a valve member; and means for correctively controlling timings of opening and closing of the intake control valves mutually-independently by use of the drive means on the basis of a predetermined condition of the engine.

BRIEF DESCRIPTION OF THE DRAWINGS

FIG. 5 is a diagram showing the relation between the engine speed and the timing of opening the intake control valves in the first embodiment.

FIG. 6 is a diagram showing the relation among the engine speed, the engine load, and the timing of closing the intake control valves in the first embodiment.

FIG. 17 is a diagram showing the relation between the engine speed and the acceleration/deceleration corrective advance angle in the third embodiment.

FIG. 18 is a diagram showing the relation between corrective coefficients and the pressure in the engine.

FIG. 19 is a timing diagram showing the conditions of the intake control valve and the inlet valve which occur during decceleration in the third embodiment.

DESCRIPTION OF THE FIRST PREFERRED EMBODIMENT

Figure 1:
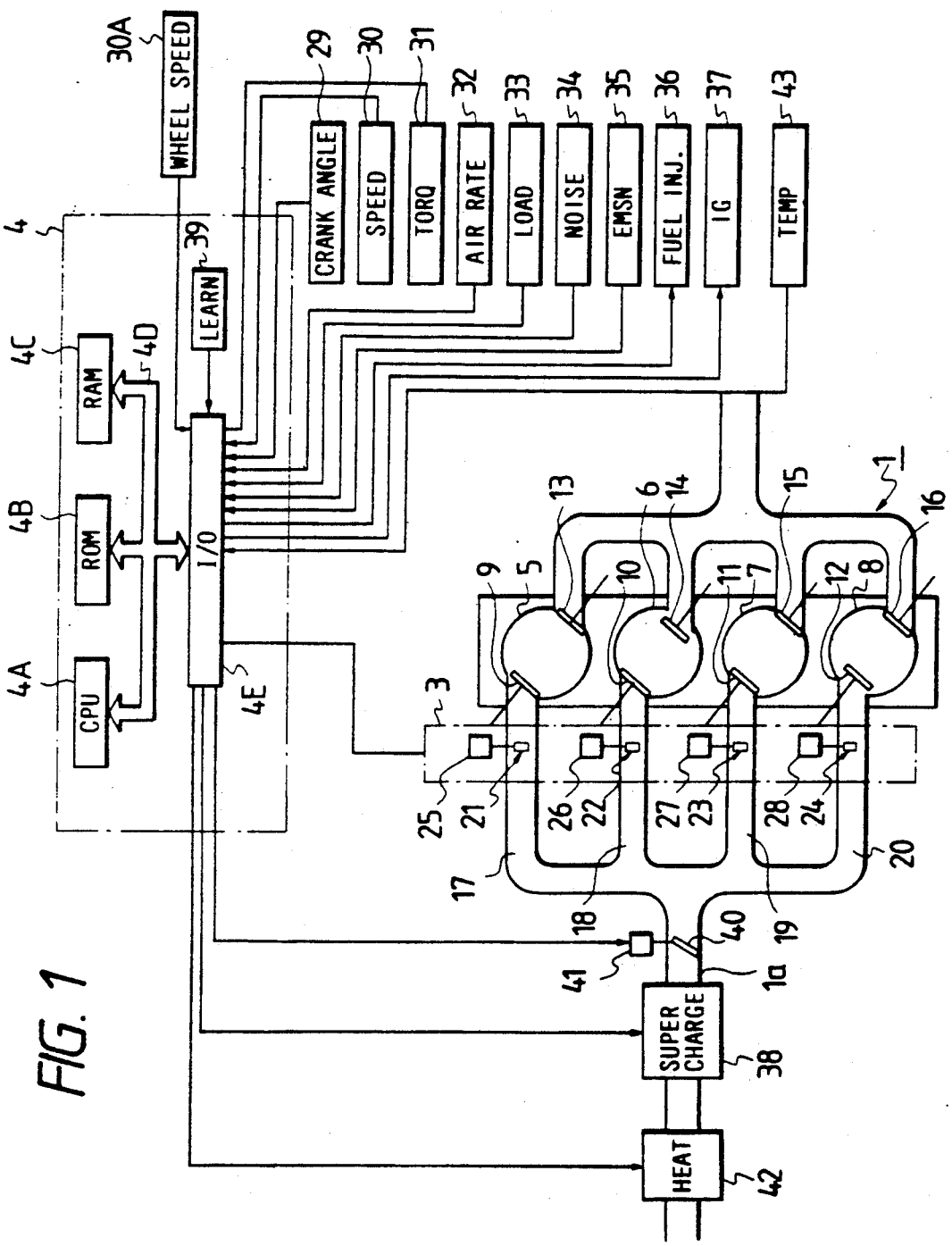
FIG. 1 is a diagram of a system according to a first embodiment of this invention.

With reference to FIG. 1, an internal combustion engine 1 has four cylinders (combustion chambers) 5, 6, 7, and 8. The engine 1 is provided with an intake section 1a including an intake control section 3. The intake control section 3 is controlled by an electronic control unit (ECU) 4.

Inlet valves 9, 10, 11, and 12 are provided in the combustion chambers 5, 6, 7, and 8 respectively. Outlet valves 13, 14, 15, and 16 are provided in the combustion chambers 5, 6, 7, and 8 respectively. The inlet valves 9-12 and the outlet valves 13-16 are driven by an output power of the engine 1 via known valve drive mechanisms (not shown).

A throttle valve 40 is disposed in an intake passage defined in the intake section 1a. The throttle valve 40 is driven by an actuator 41. Specifically, the degree of opening of the throttle valve 40 is adjusted by the actuator 41. The actuator 41 is controlled by the ECU 4.

In the intake section 1a, the intake passage branches into intake ports 17, 18, 19, and 20 at a point downstream of the throttle valve 40. The intake ports 17, 18, 19, and 20 lead to the cylinders 5, 6, 7 and 8 respectively. The intake control section 3 includes intake control valves 21, 22, 23, and 24 disposed in the intake ports 17, 18, 19, and 20 respectively. The intake control valves 21, 22, 23, and 24 are driven by actuators 25, 26, 27, and 28 respectively. The actuators 25, 26, 27, and 28 are controlled by the ECU 4. The intake control valves 21-24 can be mutually-independently controlled in opening and closing timings.

A crank angle sensor 29 outputs a pulse signal when pistons (not shown) in the cylinders 5-8 reach top dead centers (TDC). A rotational speed sensor 30 outputs a signal representing the rotational speed of the engine 1. Combustion sensors 31 output signals representing conditions of combustion in the cylinders 5-8 respectively. The combustion sensors 31 can be pressure sensors within the cylinders 5-8, torque sensors, or knock sensors. Flow rate sensors 32 output signals representing the rates of air flow into the cylinders 5-8 respectively. The flow rate sensors 32 are disposed in the points of the intake ports 17-20 downstream of the intake control valves 21-24. The flow rate sensors 32 can be pressure sensors in the intake ports 17-20. A load sensor 33 outputs a signal representing a load on the engine 1. The load sensor 33 can be a throttle sensor detecting the position of throttle valve 40 or an accelerator sensor detecting the position of an accelerator pedal (not shown). A noise sensor 34 outputs a signal representing noise generated from the engine 1. The noise sensor 34 may be replaced by a vibration sensor detecting vibration related to the engine 1. An emission sensor 35 outputs a signal representing conditions of emission from the engine 1. In the case where the engine 1 powers a vehicle, vehicle wheel speed sensors 30A are provided which output signals representing rotational speeds of front and rear vehicle wheels.

A fuel injection section 36 includes fuel injectors which serve to inject fuel into the intake ports 17, 18, 19, and 20 at rates controlled by the ECU 4 respectively. An ignition section 37 includes spark plugs associated with the cylinders 5-8 respectively. The timings of occurrence of sparks in the cylinders 5-8 are controlled by a control signal fed from the ECU 4 to the ignition section 37. A super charger 38 serves to introduce air into the cylinders 5-8 at an increased rate. The super charger 38 includes a compressor or a blower disposed in the intake passage upstream of the throttle valve 40. The super charger 38 is controlled by the ECU 4. A heating device 42 serves to heat air in the part of the intake passage upstream of the compressing part of the super charger 38. The heating device 42 is controlled by the ECU 4. A temperature sensor 43 outputs a signal representing the temperature of coolant of the engine 1.

The ECU 4 includes a microcomputer having a logic operation circuit composed of a combination of a CPU 4A, a ROM 4B, and a RAM 4C. The ECU 4 also includes an input/output (I/O) section 4E. The CPU 4A, the ROM 4B, the RAM 4C, and the I/O section 4E are mutually connected via a bus 4D. The ECU 4 includes a learning control device 39 connected to the I/O section 4E. The learning control device 39 enables the ECU 4 to execute learning control responsive to conditions of the engine 1. The I/O section 4E receives the output signals from the sensors 29-35 and 43. The I/O section 4E outputs control signals to the devices 25-28, 36-38, 41, and 42. The ECU 4 processes the output signals from the sensors 29-35 and 43, and generates the control signal to the devices 25-28, 36-38, 41, and 42 on the basis of the output signals from the sensors.

The intake control valves 21-24 are similar in structure. The actuators 25-28 are similar in structure.

Therefore, only a pair of the intake control valve 21 and the actuator 25 will be described in detail.

Figure 2:
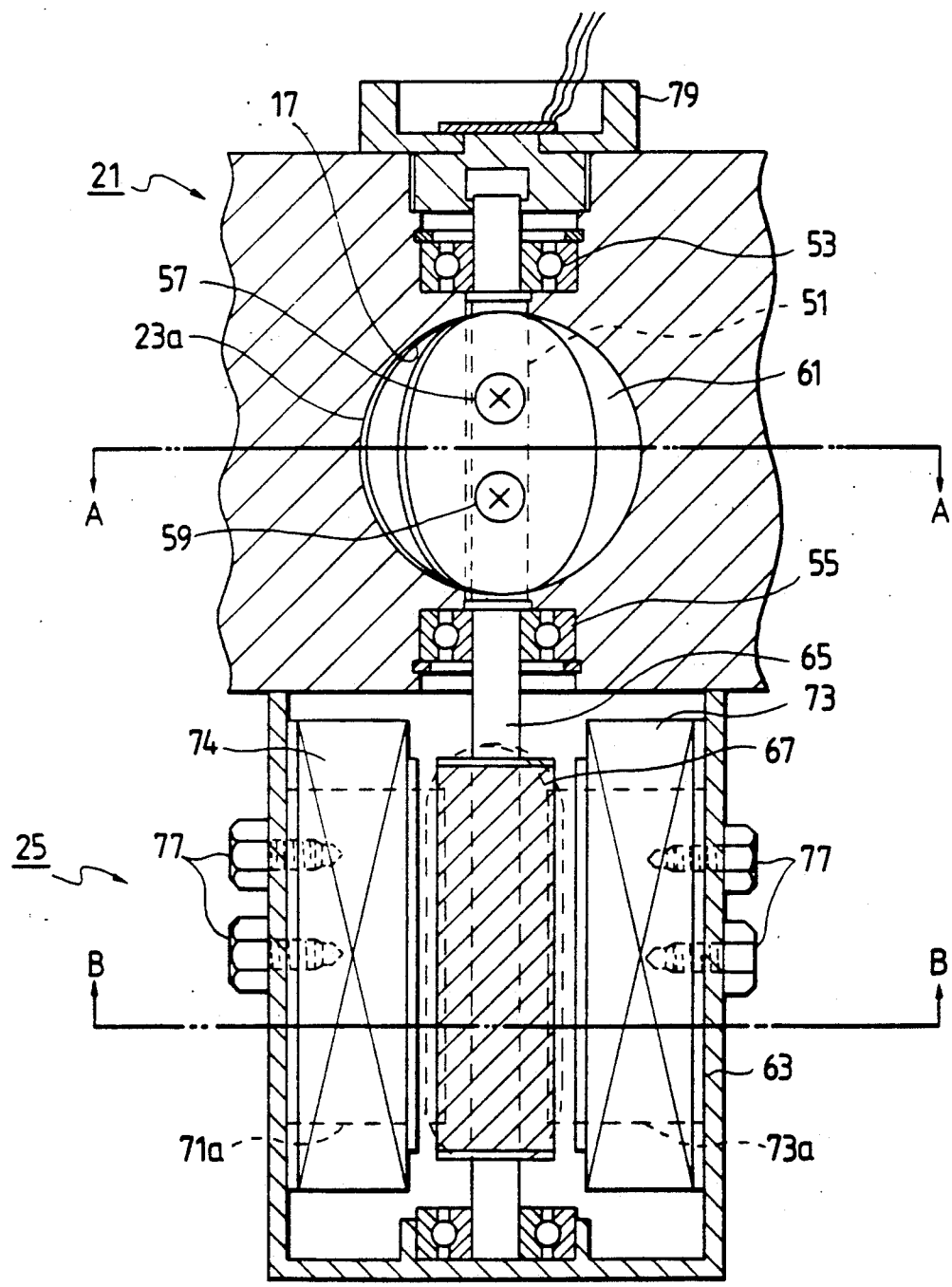
FIG. 2 is a sectional view of the intake control valve and the related actuator of FIG. 1.
Figure 3:
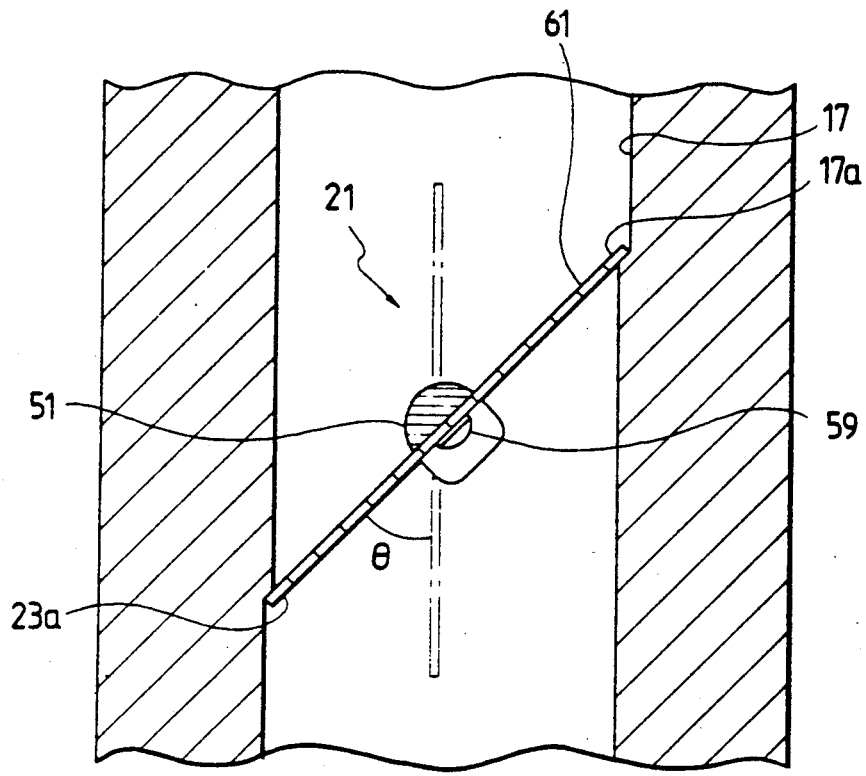
FIG. 3 is a sectional view taken along the line A—A of FIG. 2.

As shown in FIGS. 2 and 3, the intake control valve 21 includes a valve member 61 disposed in the intake port 17, and a valve shaft 51 extending diametrically through the intake port 17. The valve member 61 is of a disc shape, having a diameter slightly larger than or approximately equal to the diameter of the intake port 17. A part of the shaft 51 has a semicircular cross section extending in the intake port 17. The rest of the shaft 51 has a circular cross section. The valve disc 61 is fixed to the semicircular part of the shaft 51 by means of bolts 57 and 59. The shaft 51 is rotatably supported by bearings 53 and 55. Thus, the valve disc 61 can rotate about the axis of the shaft 51.

The walls defining the intake port 17 has a ring-shaped step 17a forming a valve seat for the valve disc 61. In a closed position of the valve disc 61, the the edge of the valve disc 61 contacts the valve seat 17a and blocks the intake port 17. In this closed position, the valve disc 61 forms a predetermined angle 8, for example, an angle of 67.5 degrees, with respect to the axis of the intake port 17. This design is realized by suitable choice of the position of the step 17a and the diameter of the valve disc 61. As the valve disc 61 moves from the closed position, the degree of opening through the valve disc 61 increases. When the valve disc 61 moves to a position where the valve disc 61 is parallel to the axis of the intake port 17, the degree of opening through the valve disc 61 is maximized. This position agrees with a fully open position of the valve disc 61.

Figure 4:
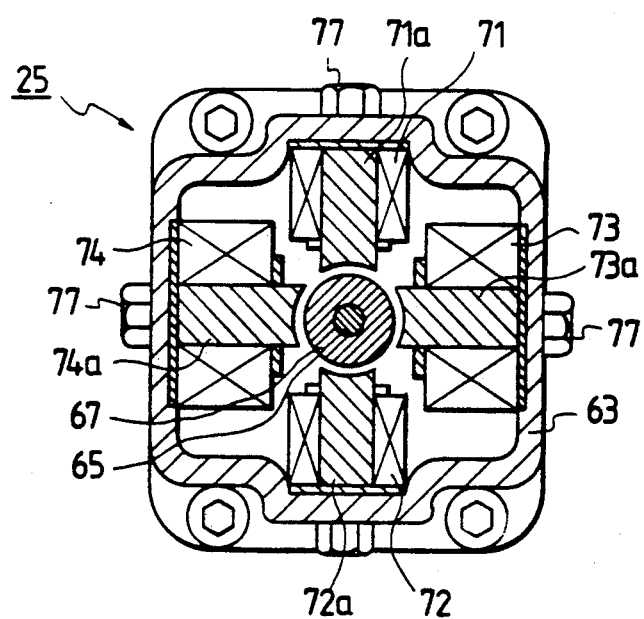
FIG. 4 is a sectional view taken along the line B—B of FIG. 2.

As shown in FIGS. 2 and 4, the actuator 25 has a casing 63. The actuator 25 includes a stepping motor of the PM type. The casing 63 accommodates a shaft 65, a permanent magnet 67, and windings 71, 72, 73, and 74. The shaft 65 is connected to the shaft 51. The shaft 65 may be integral with the shaft 51. The permanent magnet 67 has a form of a cylinder, being fixed to the shaft 65 and extending concentrically around the shaft 65. The windings 71-74 are arranged in a 2-phase 4-pole configuration. surrounding the permanent magnet 67. The windings 71-74 include 4 enamel wires wound on cores 71a, 72a, 73a, and 74a in a monofilar manner respectively. The cores 71a-74a are fixed to the casing 63 by bolts 77.

The windings 71 and 72 diametrically oppose each other and have a first common phase. The windings 71 and 72 can determine a stable open position of the valve disc 61. The windings 73 and 74 diametrically oppose each other and have a second common phase. The windings 73 and 74 can determine a stable closed position of the valve disc 61. A pair of the windings 71 and 72, and a pair of the windings 73 and 74 are angularly offset from each other by an angle of 90 degrees. The valve disc 61 can rotate in an angular range corresponding to the predetermined angle $\theta$. The predetermined angle $\theta$ is chosen so that it is smaller than the offset angle, that is, an angle of 90 degrees, between the pairs of the windings.

When the ECU 4 energizes the windings 71 and 72, the windings 71 and 72 generate magnetic fluxes which rotate the permanent magnet 67. As the permanent magnet 67 rotates, the shafts 51 and 65 rotate and also the valve disc 61 rotates from its closed position. Then, the permanent magnet 67 stops at a stable position determined by the windings 71 and 72. This position corresponds to the fully open position of the valve disc 61.

When the ECU 4 energizes the windings 73 and 74, the windings 73 and 74 generate magnetic fluxes which rotate the permanent magnet 67. As the permanent magnet 67 rotates, the shafts 51 and 65 rotate and also the valve disc 61 rotates from its fully open position. Then, the valve disc 61 stops at its closed position when the valve disc 61 encounters the valve seat 17a.

As shown in FIG. 2, a rotational speed sensor 79 is associated with an end of the shaft 51. The rotational speed sensor 79 serves to detect the rotational speed of the valve disc 61. The rotational speed sensor 79 includes a permanent magnet fixed to the shaft 51, and windings surrounding the permanent magnet. As the shaft 51 and the valve disc 61 rotate, the windings generate an electric signal representing the rotation of the valve disc 61. The electric signal is outputted from the rotational speed sensor 79 to the ECU 4 and is used in various types of intake control executed by the ECU 4.

The ECU 4 calculates rates of air flow into the cylinders 5-8 on the basis of the output signals from the flow rate sensors 32 and also instruction signals for opening and closing timings of the intake control valves 21-24 which are given to the actuators 25-28 respectively. The ECU 4 controls the fuel injectors of the fuel injection section 36 in response to the calculated air flow rates so that the rates of fuel injected via the fuel injectors can be varied in accordance with the calculated air flow rates respectively.

The ECU 4 determines desired opening timings of the intake control valves 21-24 on the basis of the output signal from the engine rotational speed sensor 30. As shown in FIG. 5, the desired opening timings of the intake control valves 21-24, which are represented as advance crank angles relative to the top dead centers, are increased as the engine rotational speed rises.

Figure 7:
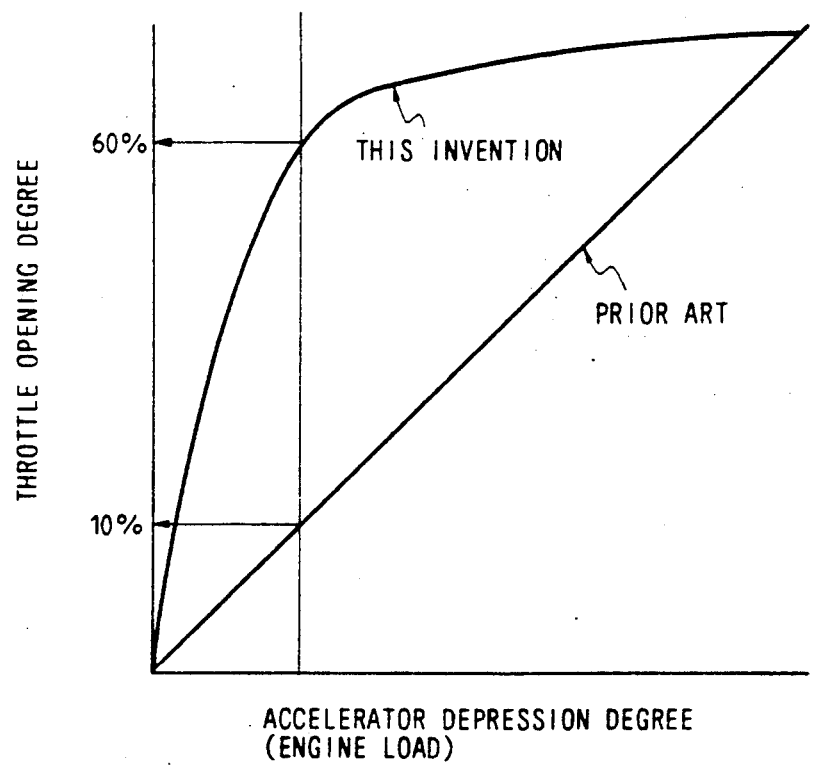
FIG. 7 is a diagram showing the relation between the degree of depression of the accelerator pedal and the degree of opening of the throttle valve in the first embodiment and the prior art.

The ECU 4 also controls closing timings of the intake control valves 21-24 as follows. In general, an intake air flow rate is determined by the product of an air density and an intake time. The air density is adjusted by the throttle valve 40. To reduce a pumping loss caused by the provision of the intake air control valves 21-24, the intake times for the cylinders 5-8 are adjusted by the air intake control valves 21-24 in accordance with the engine load respectively. Specifically, as shown in FIG. 6, basic components of desired closing timings of the intake control valves 21-24, which are represented as advance crank angles relative to the top dead centers, are varied as a function of the engine load and the engine rotational speed. As shown in FIG. 7, the degree of depression of the accelerator pedal, that is, the engine load, has a predetermined relation with the degree of opening of the throttle valve 40.

Figure 8:
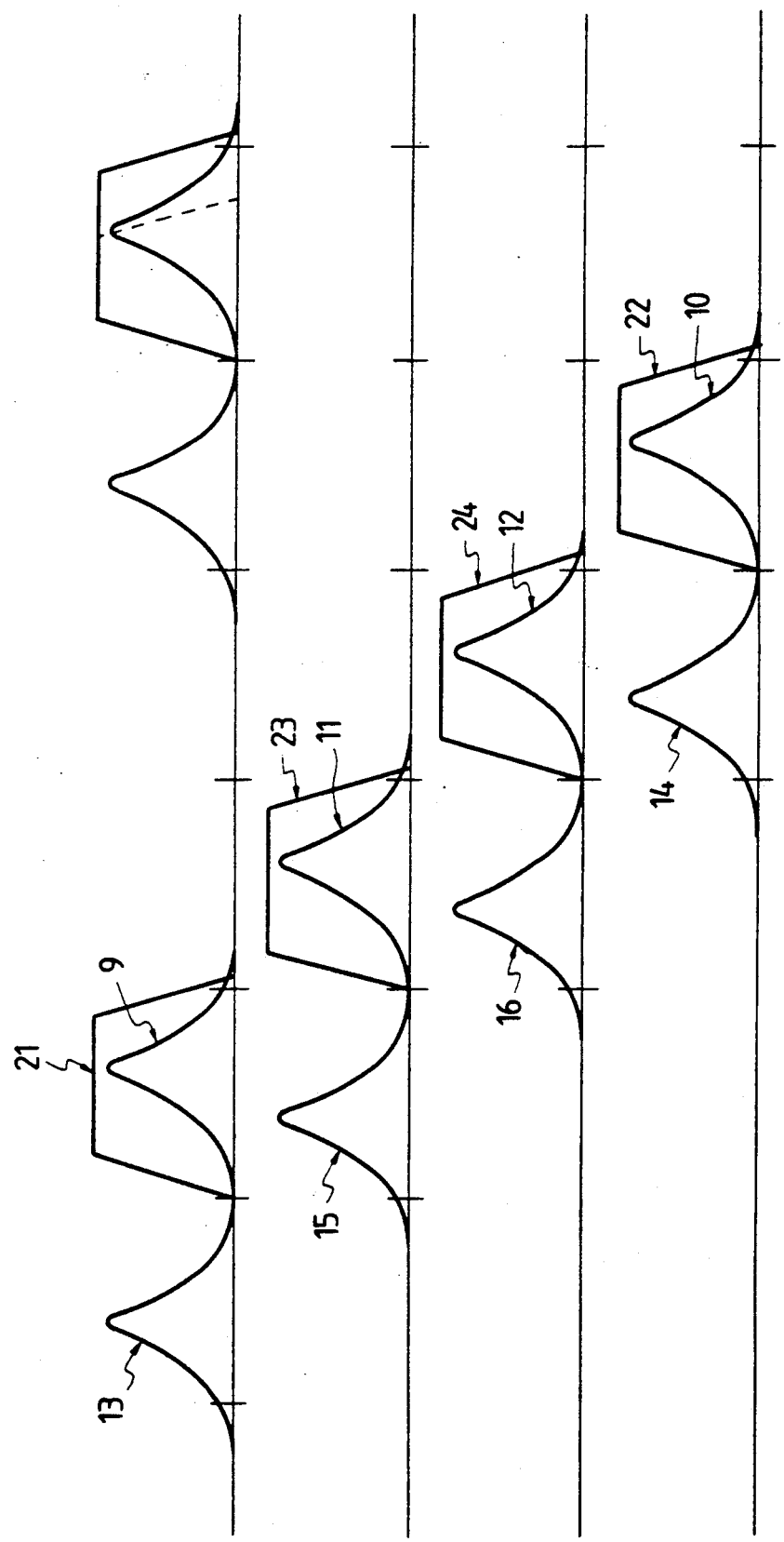
FIG. 8 is a timing diagram which shows opening and closing profiles of the intake control valves and the inlet valves which occur at a low engine speed in the first embodiment.

FIG. 8 shows opening and closing profiles of the intake control valves 21-24, and opening and closing profiles of the inlet valves 9-12 which occur at a low engine rotational speed. In this case, the intake control valves 21-24 start to open at the top dead centers, and move to their closed positions before the related inlet valves 9-12 are fully closed.

Figure 9:
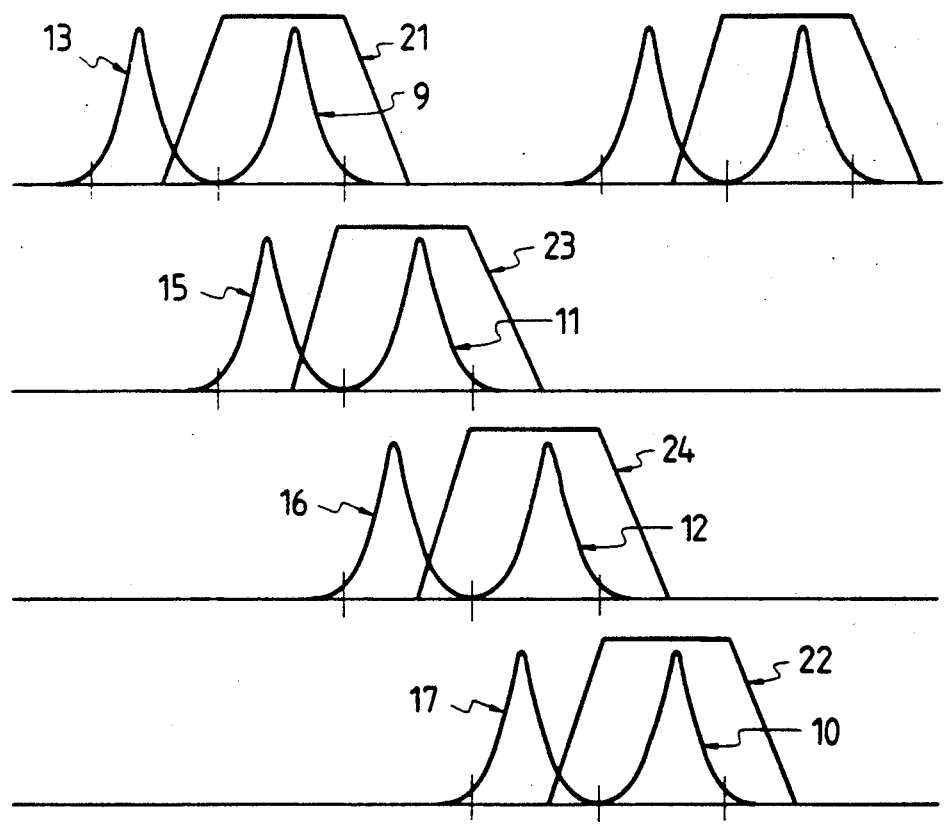
FIG. 9 is a timing diagram which shows opening and closing profiles of the intake control valves and the inlet valves which occur at a high engine speed in the first embodiment.

FIG. 9 shows opening and closing profiles of the intake control valves 21-24, and opening and closing profiles of the inlet valves 9-12 which occur at a high engine rotational speed. In this case, the intake control valves 21-24 start to open before the related inlet valves 9-12 are opened, and move to their closed positions after the related inlet valves 9-12 are fully closed. At such a high engine rotational speed, the intake control valves 21-24 may be continuously held fully open.

The desired closing timings of the intake control valves 21-24 have various corrective components in addition to the basic components. As will be made clear later, the corrective components are determined on the basis of various parameters, such as operating conditions of the engine 1 and operating conditions of the cylinders 5-8. Since the corrective components can be varied from cylinder to cylinder, all the closing timings of the intake control valves 21-24 can be optimized for the cylinders 5-8 respectively even when the cylinders 5-8 are exposed to different conditions respectively. The optimal closing timings of the intake control valves 21-24 result in optimal rates of air flow into the cylinders 5-8.

Specifically, the desired closing timing of each of the intake control valves 21-24, which is represented as an advance angle TC relative to the top dead center, is calculated by referring to the following equation.

$$TC = TCBSE + TTC + FTC + TRTC + BTC + NTC + NETC + TDC \quad (1)$$

where TCBSRE denotes and advance angle correspondign to a basic component of the desired closing timing of the related intake control valve which is shown in FIG. 6; TTC denotes a corrective advance angle related to the air-to-fuel ratio which is effected during a transient condition; FTC denotes a corrective advance angle related to the mixture burning temperature; TRTC denotes an advance angle related to acceleration slip (traction) control which is introduced in the case where the engine 1 powers a vehicle; BTC denotes an advance angle related to air intake control for braking which is executed during deceleration; NTC denotes a corrective advance angle related to the occurrence of knocking; NETC denotes a corrective advance angle for control of equalizing the rates of air flow into the cylinders 5-8; and TDC denotes a corrective advance angle for compensating an ageing variation of the related actuator.

The ECU 4 controls the actuators 25-28 so that the actual opening timings of the intake control valves 21-24 will agree with the desired opening timings of the intake control valves 21-24, and that the actual closing timings of the intake control valves 21-24 will agree with the desired closing timings of the intake control valves 21-24. As understood from the equation (1), the desired closing timings of the intake control valves 21-24 are varied as functions of the factors NETC which are designed so as to equalize the rates of air flow into the cylinders 5-8. The values of the factors NETC are set in response to the rates of air flow into the cylinders 5-8 which are detected by the flow rate sensors 32 respectively. The operation of the factors NETC prevents problems such as a reduction of the torque output from the engine 1, vibrations, and intake noises, which might be caused when the rates of air flow into the cylinders 5-8 are different.

Figure 10:
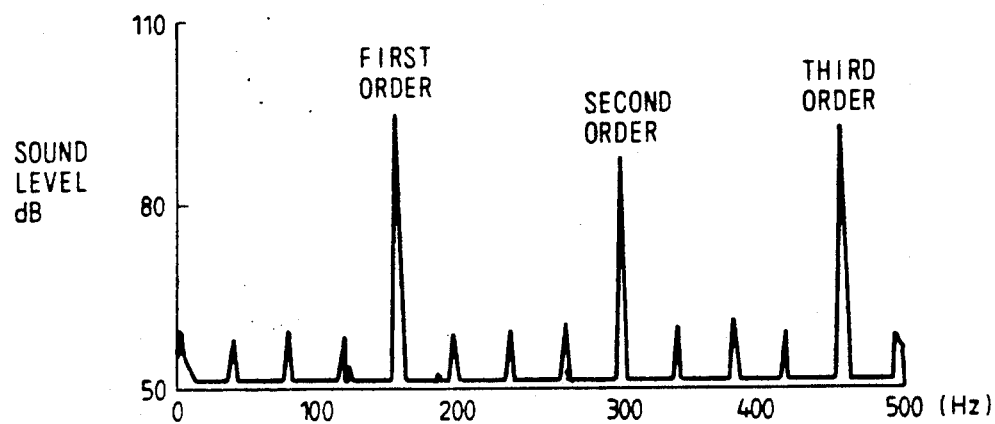
FIG. 10 is a diagram showing a frequency spectrum of sounds generated by the engine in the first embodiment.

As shown in FIG. 10, the control of equalizing the air flow rates can reduce the levels of ½-fraction intake sound components adjacent to the first-order, the second-order, and the third-order intake sound components.

Figure 11:
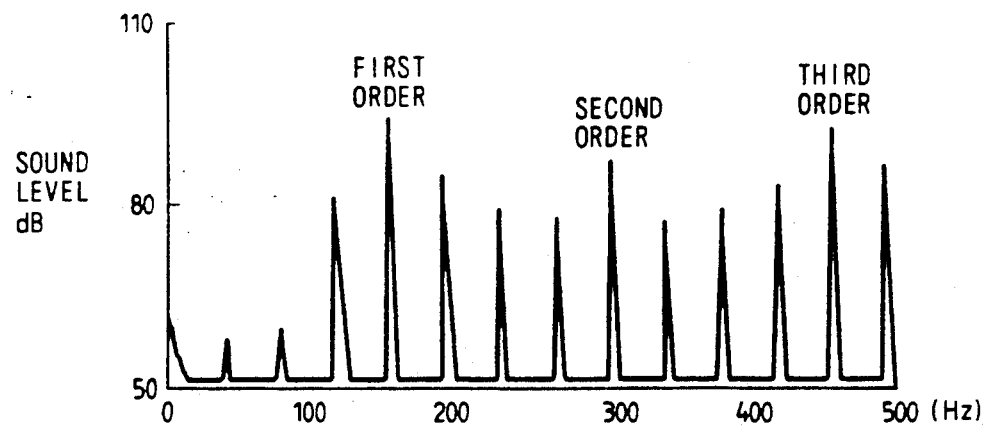
FIG. 11 is a diagram showing a frequency spectrum of sounds generated by an engine.

FIG. 11 is presented for making clear the rate may be calculated by the ECU from the difference between the rotational speeds of the right-hand and left-hand vehicle wheels which are given from rotational speed sensors 30A.

Figure 12:
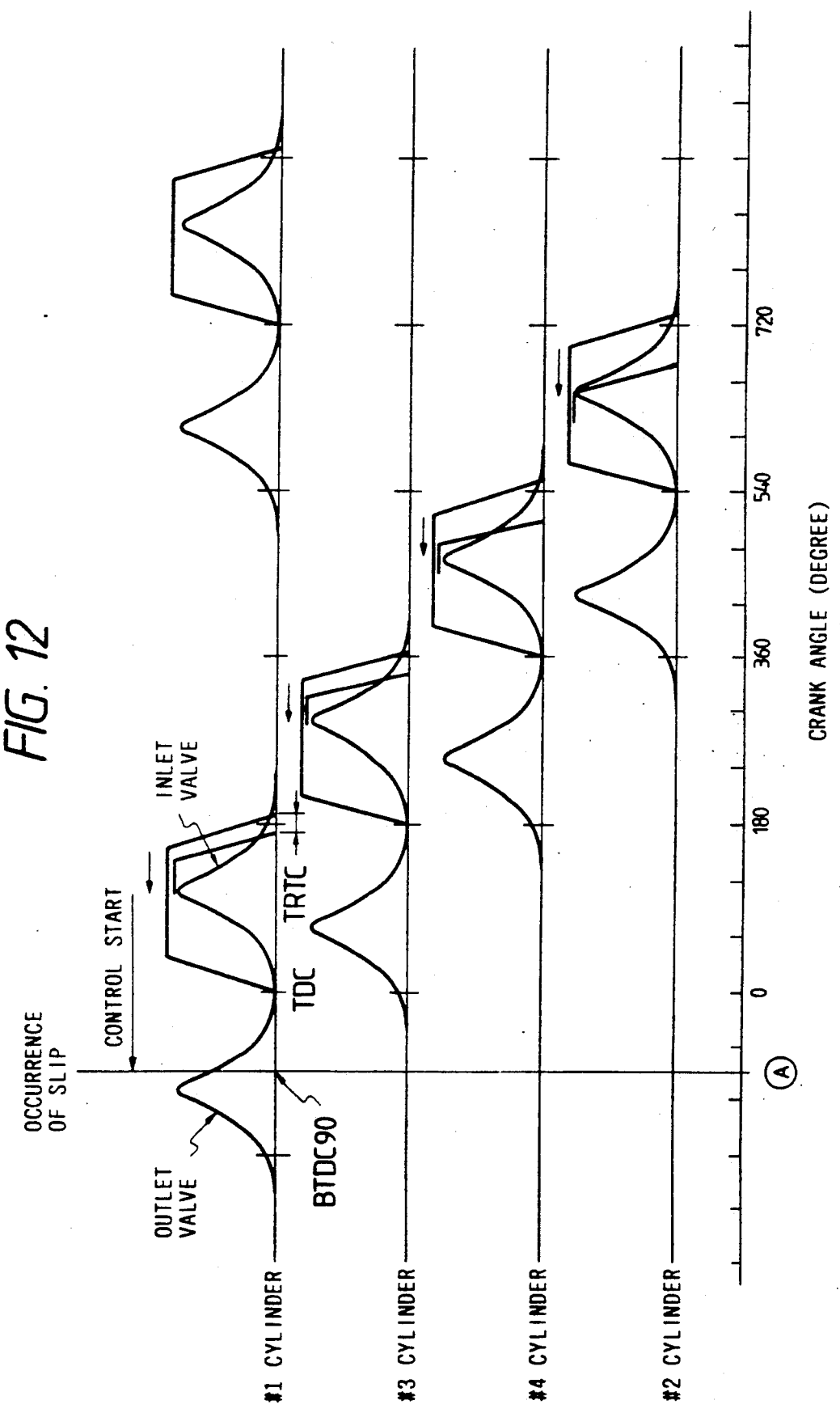
FIG. 12 is a timing diagram which shows opening and closing profiles of intake control valves and inlet valves which occur before and after a slip occurs in a second embodiment of this invention.

FIG. 12 shows opening and closing profiles of the intake control valves 21-24, and opening and closing profiles of inlet valves 9-12. In cases where a slip of the vehicle wheels occurs at a moment A of FIG. 12, the ECU 4 closes the intake control valve 21 for a #1 cylinder (a cylinder 5) at an early stage by executing a slip and intake control program and by calculating a corrective factor TRTC of the equation (1).

Figure 13:
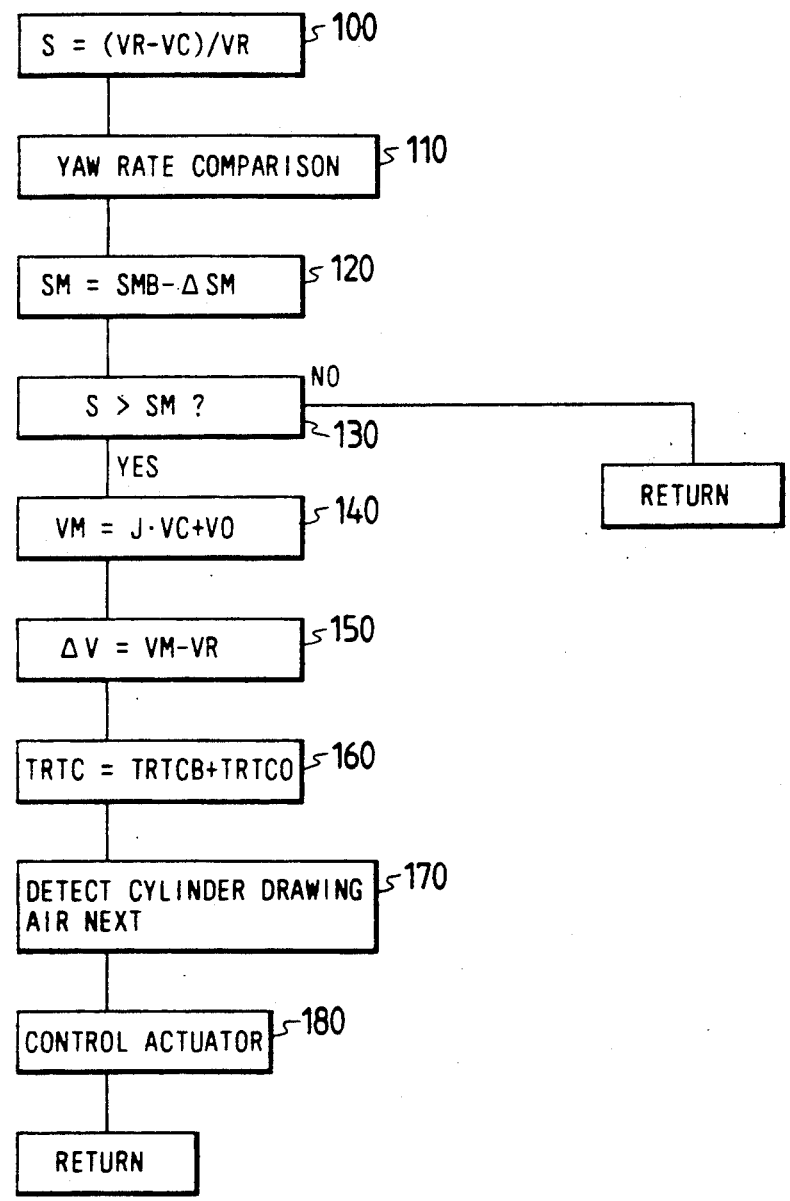
FIG. 13 is a flowchart of a slip and intake control program executed in the second embodiment.

FIG. 13 is a flowchart of the slip and intake control program. As shown in FIG. 13, a first step 100 of the program calculates the slip ratio S by referring to the equation "S=(VR−VC)/VR" where VC denotes the vehicle speed and the VR denotes the driven wheel speed. A step 110 following the step 100 compares the measured yaw rate and a desired yaw rate. A step 120 following the step 110 calculates a target slip ratio SM by referring the equation "SM=SMB−ΔSM" where SMB denotes a target slip ratio for straight travel of the vehicle, and ΔSM denotes a value determined by the measured yaw rate. A step 130 following the step 120 compares the slip ratios S and SM given by the steps 100 and 120. When the slip ratio S is greater than noise-reduction advantage shown in FIG. 10. FIG. 11 shows the levels of intake sound components which occur in cases where such control of equalizing air flow rates is omitted and the air flow rates are different from each other. As shown in FIG. 11, in these cases, ½-fraction intake sound components adjacent to the first-order, the second-order, and the third-order intake sound components have significant levels.

DESCRIPTION OF THE SECOND PREFERRED EMBODIMENT

A second embodiment of this invention is similar to the embodiment of FIGS. 1-10 except for a design indicated later. The second embodiment is applied to cases where an engine 1 powers a vehicle. The second embodiment performs traction control of the vehicle by adjusting intake air control valves 21-24.

The vehicle has wheels driven by the engine 1. The rotational speed of at least one of the driven wheels is monitored by a rotational speed sensor 30A. This rotational speed sensor 30A. This rotational speed sensor informs an ECU 4 of the monitored rotational speed of the driven wheel. A speed sensor (not shown) monitors the speed of the body of the vehicle. This speed sensor informs the ECU 4 of the monitored vehicle speed. A yaw rate sensor (not shown) monitors the yaw rate of the vehicle body. The yaw rate sensor informs the ECU 4 of the monitored yaw rate of the vehicle body. The yaw the slip ratio SM, the program advances to a step 140. When the slip ratio S is smaller than the slip ratio SM, the program returns to the first step 100.

The step 140 calculates a target speed VM by referring to the equation "VM=J·VC+VO" where J denotes a coefficient being approximately in the range of 1.1 to 2.0 and being dependent on the slip ratio S; VC denotes the vehicle speed; and VO denotes a safety speed value or a corrective value determined by learning processing. A step 150 following the step 140 calculates the difference ΔV between the target speed VM and the driven wheel speed VR by referring to the equation "ΔV=VM−VR". A step 160 following the step 150 calculates an advance angle TRTC used in the equation (1). Specifically, the advance angle TRTC is calculated by referring to the equation "TRTC=TRTCB+TRTCO" where TRTCB denotes a value which is increased as the difference ΔV increases, and TRTCO denotes a corrective value determined by learning processing and periodically updated during the slip control. A step 170 following the step 160 detects which of the #1-#4 cylinders (the cylinders 5-8) will draw air next. A step 180 following the step 170 sets the advance angle TRTC given by the step 160 in the equation (1), and determines the desired closing timing TC of the intake control valve of the cylinder detected by the step 170 and controls the actuator related to the intake control valve in response to the desired closing timing TC. The operation of the step 180 produces an advance in the timing of the closing of the intake control valve of the cylinder detected by the step 170. The advance in the valve closing timing reduces the rate of air flow into the cylinder, lowering the output power from the engine 1 thereby suppressing the slip of the vehicle wheels. After the step 180, the program returns to the first step 100.

Figure 14:
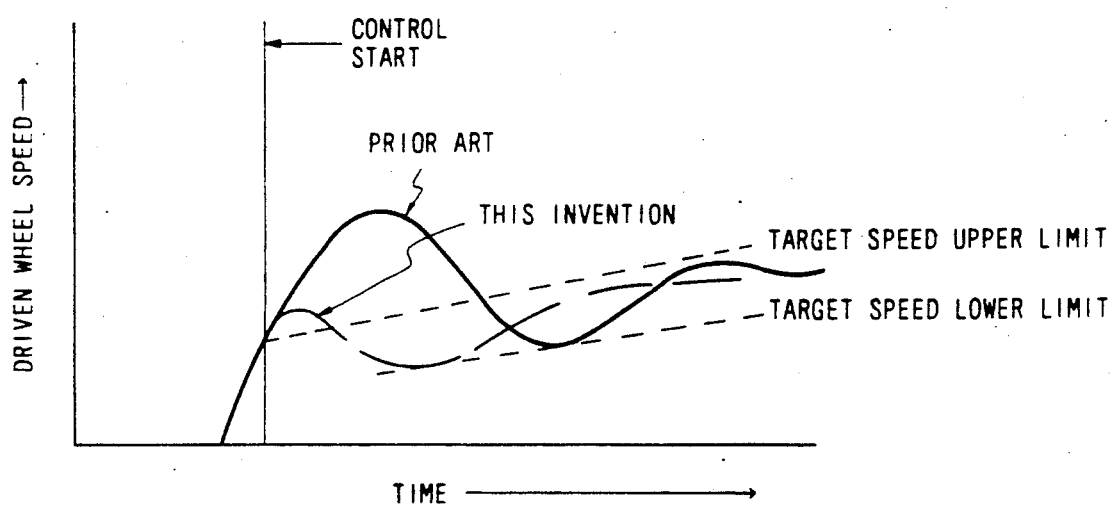
FIG. 14 is a diagram showing time-dependent variations in driven wheel speeds in the second embodiment and the prior art.

The program of FIG. 13 is periodically reiterated so that the intake control valves 21-24 are sequentially exposed to the previously-mentioned control of the valve-closing timing. The timings of closing the intake control valves 21-24 are controlled mutually-independently. As shown in FIG. 14, this control of the intake control valves 21-24 enables the driven wheel speed to quickly move into a target speed range.

DESCRIPTION OF THE THIRD PREFERRED EMBODIMENT

A third embodiment of this invention is similar to the embodiment of FIGS. 1-10 except for a design indicated later. The third embodiment performs A/F (air-to-fuel ratio) control for an engine 1.

The relation between a throttle valve and an accelerator pedal in the third embodiment is similar to that in the first embodiment. Specifically, in the third embodiment, as shown in FIG. 7, the degree of opening of a throttle valve 40 varies with the degree of depression of an accelerator pedal at a rate which depends on the degree of depression of the accelerator pedal. In a small-value range of the degree of depression of the accelerator pedal, the degree of opening of the throttle valve 40 increases with the degree of depression of the accelerator pedal at large rates. In an intermediate-value range of the degree of depression of the accelerator pedal, the degree of opening of the throttle valve 40 increases with the degree of depression of the accelerator pedal at intermediate rates. In a large-value range of the degree of depression of the accelerator pedal, the degree of opening of the throttle valve 40 increases with the degree of depression of the accelerator pedal at small rates.

Figure 15:
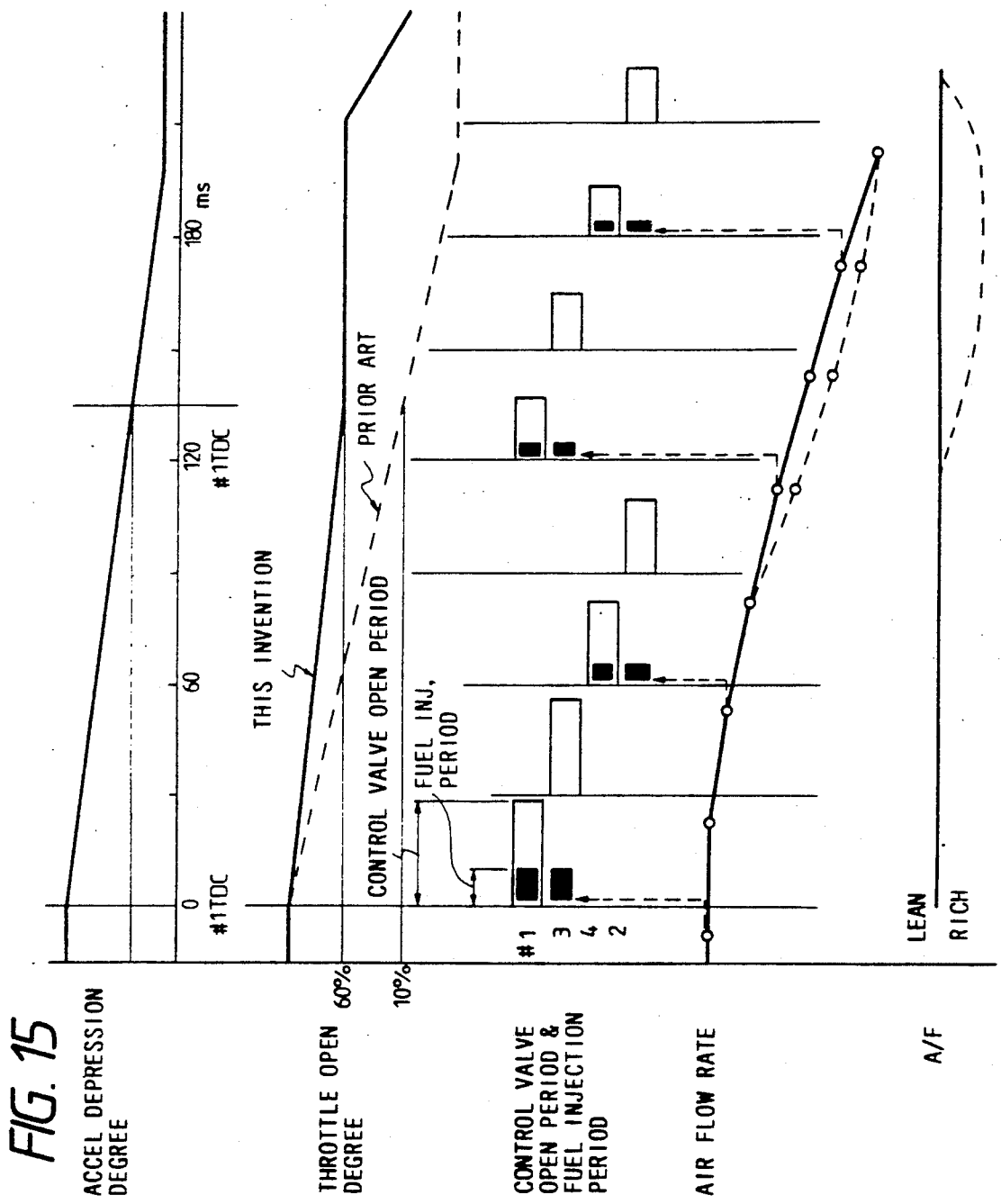
FIG. 15 is a timing diagram showing variations in various factors which occur during deceleration in the third embodiment and the prior art.

In the third embodiment, when the accelerator pedal is partially released or returned to decelerate the engine 1, the degree of opening of throttle valve 40 decreases to and temporarily stops at a value of about 60% in accordance with the relation of FIG. 7 so that the throttle valve 40 is prevented from abruptly closing as shown in FIG. 15. The value of about 60% is much greater than that in the prior art. After the A/F becomes stable, the throttle valve 40 again starts to move toward its fully closed position (see FIG. 15). Therefore, during deceleration of the engine 1, it is possible to prevent a sudden reduction of the intake air flow which would cause an excessively rich mixture. In this way, during deceleration of the engine 1, the A/F can be maintained in a good range. This is also ensured by the following A/F control.

Figure 16:
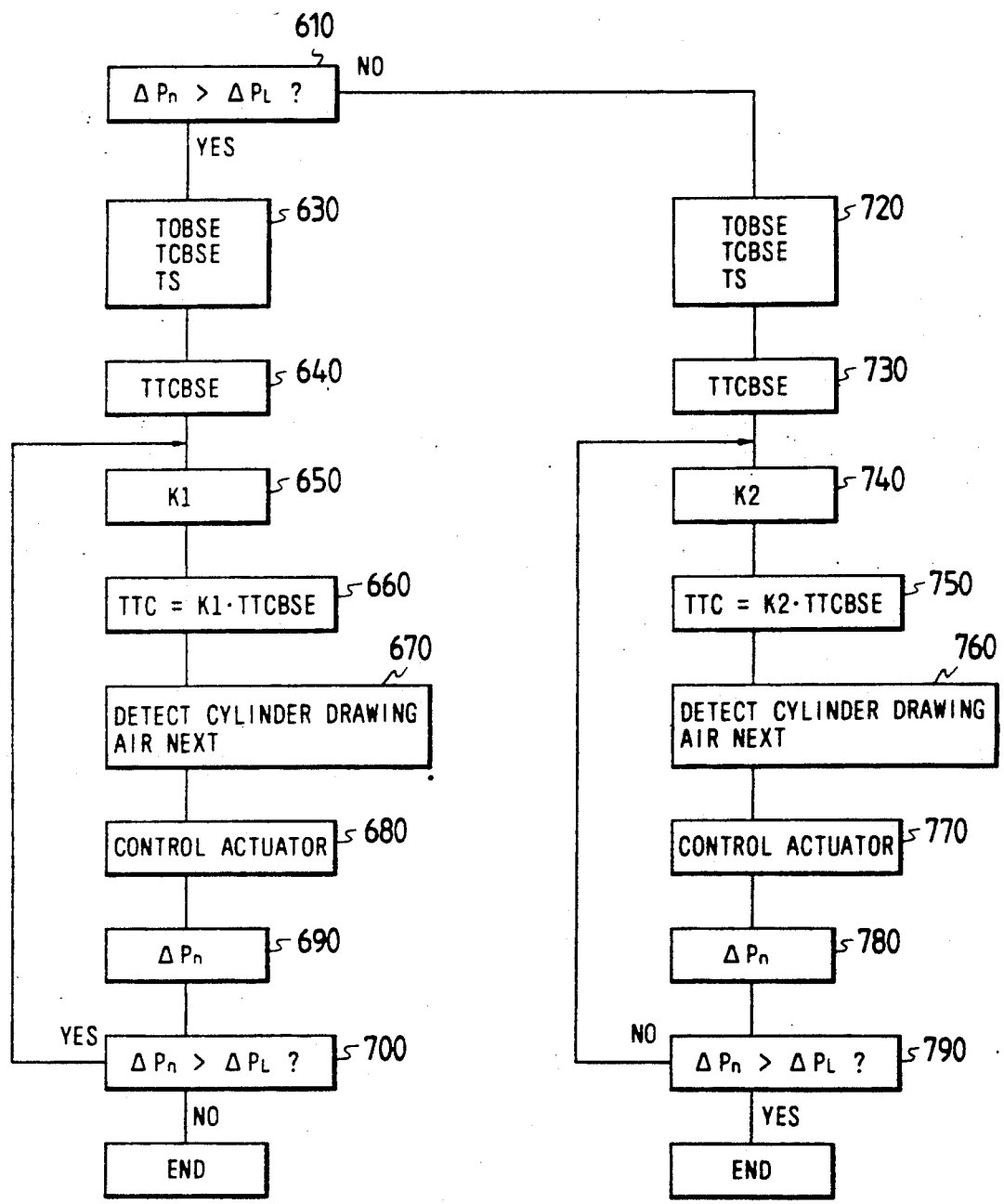
FIG. 16 is a flowchart of an A/F (air-to-fuel ratio) control program executed in the third embodiment.

FIG. 16 is a flowchart of an A/F control program executed by an ECU 4. As shown in FIG. 16, a first step 610 of the program compares a detected pressure $\Delta Pn$ in the engine 1 and a predetermined pressure $\Delta P_L$ to detect whether or not the engine 1 is required to be accelerated. When the pressure $\Delta Pn$ is higher than the pressure $\Delta P_L$, that is, when the engine 1 is required to be accelerated, the program advances to a step 630. Otherwise, the program advances to a step 720.

The step 630 reads the values of an intake control valve opening timing TOBSE, an intake control valve closing timing TCBSE, and the degree TS of opening of the throttle valve 40. A step 640 following the step 630 determines an acceleration/deceleration corrective advance angle TTCBSE on the basis of the rotational speed of the engine 1 by referring a table shown in FIG. 17. After the step 640, the program advances to a step 650.

Figure 20:
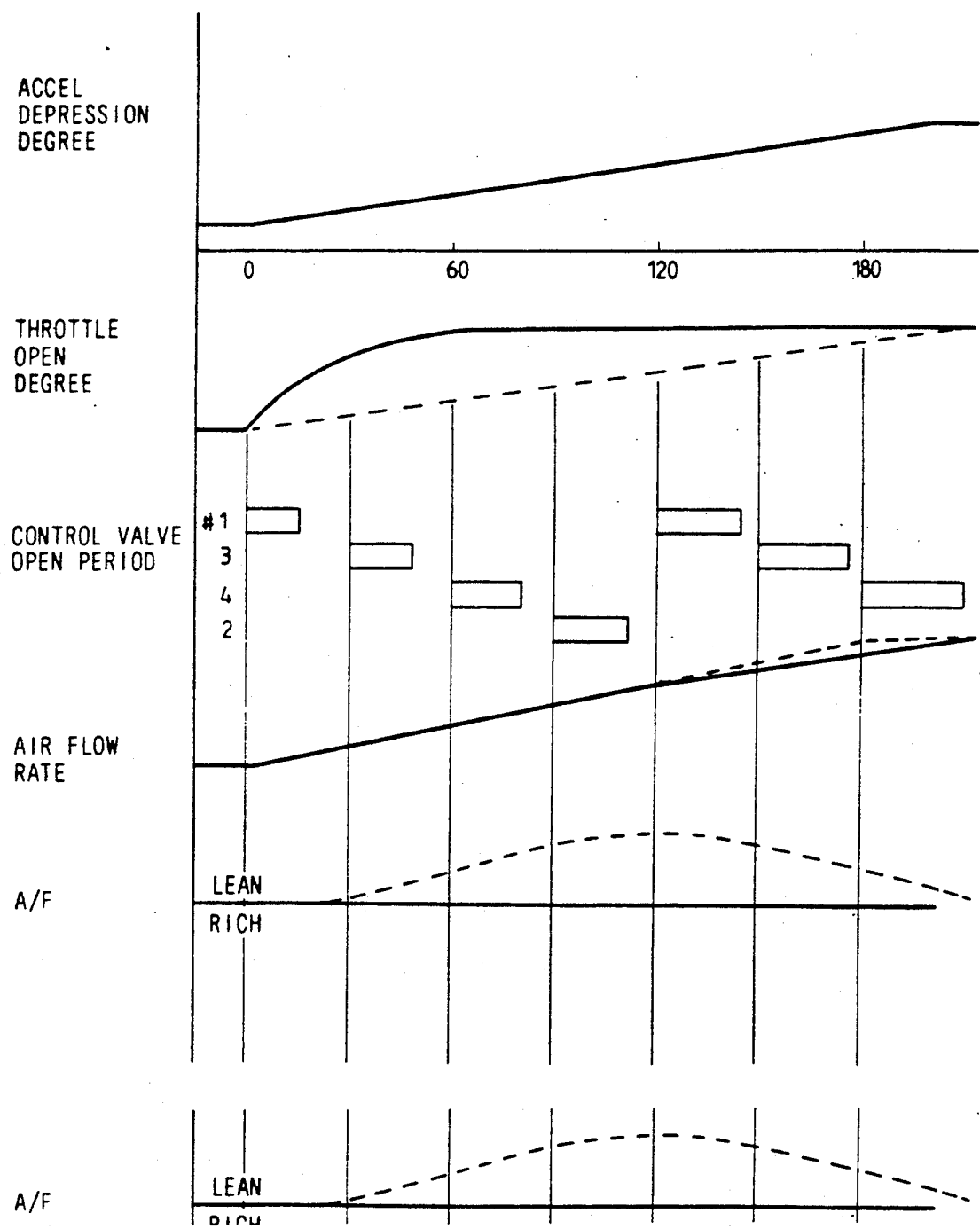
FIG. 20 is a timing diagram showing variations in various factors which occur during acceleration in the third embodiment and the prior art.

The step 650 determines a corrective coefficient K1 on the basis of the pressure $\Delta Pn$ by referring to a predetermined functional relation shown in FIG. 18. A step 660 following the step 650 calculates an acceleration corrective advance angle TTC by referring to the equation "TTC=K1·TTCBSE". A step 670 following the step 660 detects which of #1-#4 cylinders (cylinders 5-8) will draw air next. A step 680 following the step 670 sets the corrective advance angle TTC given by the step 660 in the equation (1), and determines the desired closing timing TC of the intake control valve of the cylinder detected by the step 670 and controls the actuator related to the intake control valve in response to the desired closing timing TC. During acceleration of the engine 1, the step 680 produces an advance in the closing timing of the intake control valve. As shown in FIG. 20, this advance in the valve closing timing prevents an abrupt increase in the intake air flow rate which would cause an excessively lean mixture. In FIG. 20, with respect to the throttle opening degree, the air flow rate, and the A/F, the solid lines denote the characteristics of the third embodiment while the broken lines denote the corresponding characteristics of the prior art.

Returning to FIG. 16, a step 690 following the step 680 detects the current pressure $\Delta Pn$. A step 700 following the step 690 compares the detected pressure $\Delta Pn$ and the predetermined pressure $\Delta P_L$. When the pressure $\Delta Pn$ is higher than the pressure $\Delta P_L$, that is, when the engine 1 is still required to be accelerated, the program returns to the step 650. Otherwise, the program ends.

The step 720 reads the values of an intake control valve opening timing TOBSE, an intake control valve closing timing TCBSE, and the degree TS of opening of the throttle valve 40. A step 730 following the step 720 determines an acceleration/deceleration corrective advance angle TTCBSE on the basis of the rotational speed of the engine 1 by referring the table shown in FIG. 17. After the step 730, the program advances to a step 740.

The step 740 determines a corrective coefficient K2 on the basis of the pressure $\Delta Pn$ by referring to a predetermined functional relation shown in FIG. 18. A step 750 following the step 740 calculates a deceleration corrective advance angle TTC by referring to the equation "TTC=K2·TTCBSE". A step 760 following the step 750 detects which of the #1-#4 cylinders (the cylinders 5-8) will draw air next. A step 770 following the step 760 sets the corrective advance angle TTC given by the step 750 in the equation (1), and determines the desired closing timing TC of the intake control valve of the cylinder detected by the step 760 and controls the actuator related to the intake control valve in response to the desired closing timing TC. As shown in FIG. 19, during deceleration of the engine 1, the step 770 produces an advance in the closing timing of the intake control valve. As shown in FIG. 15, this advance in the valve closing timing prevents an abrupt decrease in the intake air flow rate which would cause an excessively rich mixture. In FIG. 15, with respect to the throttle opening degree, the air flow rate, and the A/F, the solid lines denote the characteristics of the third embodiment while the broken lines denote the corresponding characteristics of the prior art.

Returning to FIG. 16, a step 780 following the step 770 detects the current pressure ΔPn. A step 790 following the step 780 compares the detected pressure ΔPn and the predetermined pressure $\Delta P_L$. When the pressure ΔPn is higher than the pressure $\Delta P_L$, the program ends. Otherwise, the program returns to the step 740.

DESCRIPTION OF THE FOURTH PREFERRED EMBODIMENT

Figure 21:
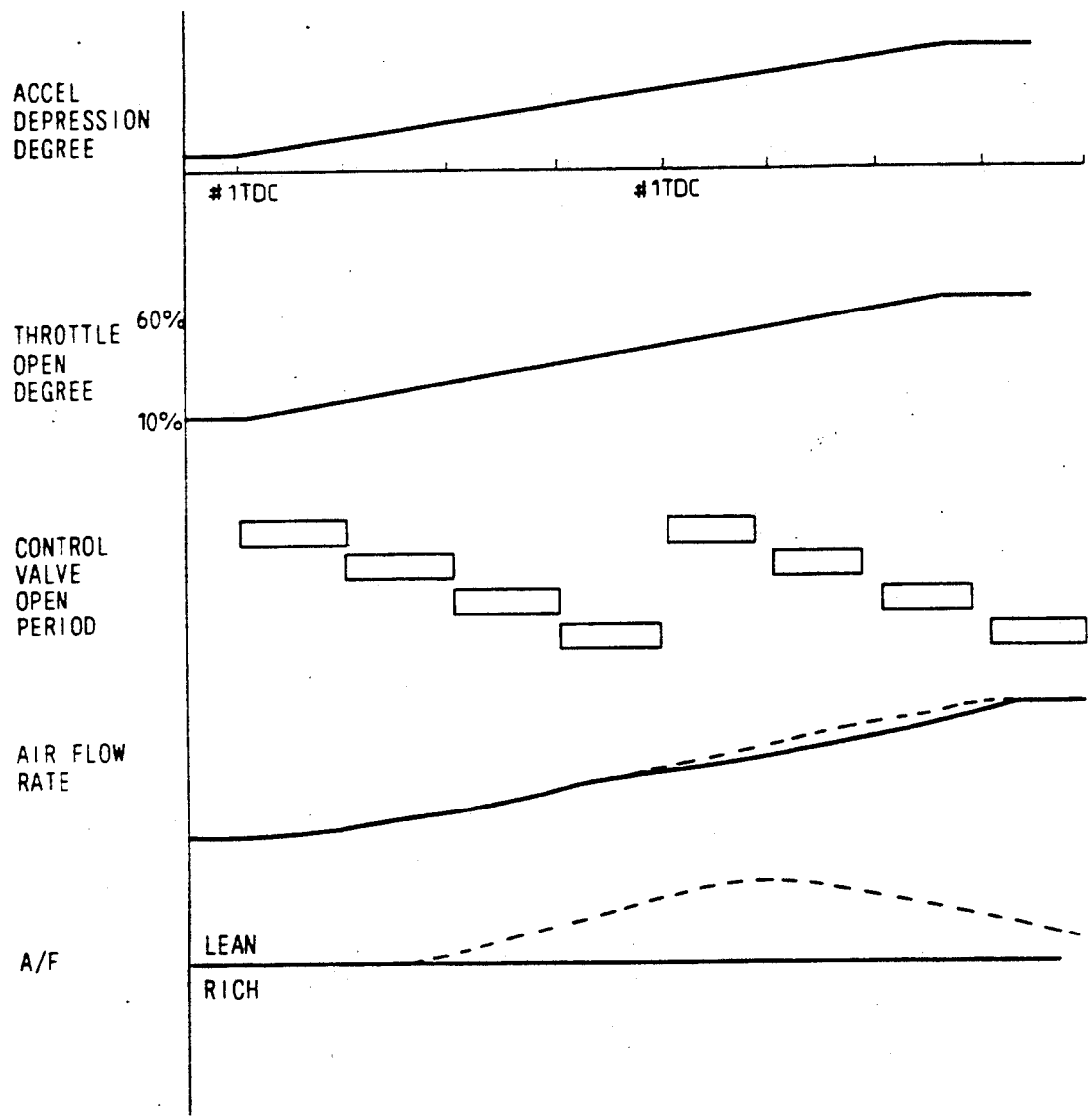
FIG. 21 is a timing diagram showing variations in various factors which occur during acceleration in a fourth embodiment and the prior art.

A fourth embodiment of this invention is similar to the embodiment of FIGS. 15-20 except that the degree of opening of a throttle valve is linear with or proportional to the degree of depression of an accelerator pedal as in the prior art (see FIG. 7). FIG. 21 shows operating characteristics of the fourth embodiment which occur during acceleration of an engine. In FIG. 21, with respect to an air flow rate and an A/F, the solid lines denote the characteristics of the fourth embodiment while the broken lines denote the corresponding characteristics of the prior art.

What is claimed is:

1. An air intake control system for an internal combustion engine having a plurality of cylinders and an intake passage associated with each of the cylinders, the system comprising:
   an intake control valve associated with each intake passage for blocking and unblocking a flow of air to each cylinder;
   driving means for opening and closing the intake control valves mutually-independently;
   detecting means for detecting a predetermined condition indicating a change in engine speed;
   cylinder determining means for determining a selected cylinder that will next draw air when the predetermined condition is detected; and
   control means for controlling the driving means to open and close the intake control valves mutually-independently to vary a time from opening to closing of the intake control valve for the selected cylinder and to vary an air amount drawn into the selected cylinder according to the change in engine speed.

2. The system of claim 1 wherein the intake control valves are controlled by the drive means so as to advance a closing time of each intake control valve.

3. The system of claim 1 wherein the predetermined condition is a variation in air flow through an intake passage generated by a variation in a degree of opening of a pressure control valve, the pressure control valve adjusting a pressure of air flowing to the cylinders via the intake control valves in accordance with an opening degree of a valve member.

4. The system of claim 3 wherein the pressure control valve is a throttle valve disposed upstream of the intake control valves.

5. The system of claim 3 wherein variations in air flow are detected by detecting variations in air pressure in an intake passage.

6. The system of claim 1 wherein the predetermined condition is a variation in rates of air flow through an intake passage.

7. The system of claim 1 wherein the predetermined condition detected is slip of a driven wheel of a vehicle containing said internal combustion engine.

8. The system of claim 7 further comprising calculating means for calculating a difference between a target speed and a speed of the driven wheel, and wherein said control means varies the closing time of each intake control valve based on the calculated difference when slip is detected.

9. The system of claim 1 wherein the control means varies the closing time of an intake control valve to vary a time from opening to closing of the intake control valve.

10. The system of claim 1 wherein the control means sets a predetermined time difference from opening to closing of each intake control valve so as to equalize a rate of air flow into the cylinders when the predetermined condition is not detected.

11. An air intake control system for an internal combustion engine for a vehicle having a plurality of cylinders and an intake passage associated with each of the cylinders, the system comprising:
    an intake control valve associated with each intake passage for blocking and unblocking a flow of air to each cylinder;
    driving means for opening and closing the intake control valves mutually-independently;
    calculating means for calculating a difference between a target speed and a speed of a driven wheel of the vehicle;
    slip detecting means for detecting a slip of a driven wheel of the vehicle;
    cylinder determining means for determining a selected cylinder that will next draw air when slip is detected; and
    control means for controlling the drive means to open and close the intake control valves mutually-independently to vary both a closing time of the intake control valve associated with the selected cylinder and to vary the air amount drawn into the selected cylinder based on the calculated difference when slip is detected.

12. An air intake control system for an internal combustion engine for a vehicle having a plurality of cylinders and an intake passage associated with each of the cylinders, the system comprising:
    an intake control valve associated with each intake passage for blocking and unblocking a flow of air to each cylinder;
    driving means for opening and closing the intake control valves mutually-independently;
    a pressure control valve adjusting a pressure of air flowing to the cylinders via the intake control valves in accordance with an opening degree of a valve member;
    detecting means for detecting a predetermined condition indicating an acceleration/deceleration of the vehicle;

cylinder determining means for determining a selected cylinder that will next draw air when the predetermined condition is detected; and control means for controlling the driving means to open and close the intake control valves mutually-independently to vary a time from opening to closing of the intake control valve associated with the selected cylinder and to vary an air amount drawn into the selected cylinder according to the acceleration/deceleration of the vehicle.

13. The system of claim 12 wherein the intake control valves are controlled by the drive means so as to advance a closing time of each intake control valve.

14. The system of claim 12 wherein the predetermined condition is a variation in air flow through an intake passage generated by a variation in a degree of opening of the pressure control valve.

15. The system of claim 14 wherein the pressure control valve is a throttle valve disposed upstream of the intake control valves.

16. The system of claim 14 wherein variations in air flow are detected by detecting variations in air pressure in the intake passage.

17. The system of claim 12 wherein the predetermined condition is a variation in rates of air flow through an intake passage.

18. The system of claim 12 wherein the predetermined condition detected is slip of a driven wheel.

19. The system of claim 18 further comprising calculating means for calculating a difference between a target speed and a speed of the driven wheel, and wherein said control means varies closing times of the intake control valve by the drive means based on the calculated difference when slip is detected.

20. The system of claim 12 wherein the control means varies the closing time of an intake control valve so as to vary a time from opening to closing of the intake control valve.

21. The system of claim 12 wherein the control means sets a predetermined time difference from opening to closing of each intake control valve so as to equalize a rate of air flow into the cylinders when the predetermined condition is not detected.

22. An air intake control system for an internal combustion engine for a vehicle having a plurality of cylinders and an intake passage associated with each of the cylinders, the system comprising:

an intake control valve associated with each intake passage for blocking and unblocking a flow of air to each cylinder;

drive means for opening and closing the intake control valves mutually-independently;

a pressure control valve adjusting a pressure of air flowing to the cylinders via the intake control valves in accordance with an opening degree of a valve member;

slip detecting means for detecting a slip of a driven wheel;

cylinder selecting means for selecting a cylinder that will next draw air when slip is detected; and varying means for varying the closing time of the intake control valve associated with the selected cylinder when slip is detected based on a difference between a target speed and a speed of the driven wheel.

23. An air intake control system for an internal combustion engine having a plurality of cylinders and an intake passage associated with each cylinder, the system comprising:

an intake control valve associated with each intake passage for blocking and unblocking a flow of air to each cylinder;

driving means for opening and closing the intake control valves mutually-independently;

a pressure control valve adjusting a pressure of air flowing to the cylinders via the intake control valves in accordance with an opening degree of a valve member;

detecting means for detecting a transient condition of the pressure control valve;

cylinder determining means for determining a selected cylinder that will next draw air when the transient condition is detected; and control means for controlling the driving means to open and close the intake control valves mutually-independently to decrease a time from open to close of the intake control valve associated with the selected cylinder according to the transient condition so as to maintain a substantially constant air/fuel ratio during the transient condition.

24. The system of claim 23 wherein the transient condition detected is a variation of a pressure in an intake passage.

25. An air intake control system for an internal combustion engine for a vehicle having a plurality of cylinders and an intake passage associated with each cylinder, the system comprising:

an intake control valve associated with each intake passage for blocking and unblocking a flow of air to each cylinder;

driving means for opening and closing the intake control valves mutually-independently;

a pressure control valve adjusting a pressure of air flowing to the cylinders via the intake control valves in accordance with an opening degree of a valve member;

detecting means for detecting a predetermined condition indicating an acceleration/deceleration of the vehicle;

cylinder determining means for determining a selected cylinders that will next draw air when the predetermined condition is detected;

setting means for setting a different time of closing for each intake control valve so as to equalize an air amount drawn to the cylinders when the predetermined condition is not detected; and control means for controlling the driving means to open and close the intake control valves mutually-independently to vary a time from opening to closing of the intake control valve associated with the selected cylinder and to vary an air amount drawn into the selected cylinder according to the acceleration/deceleration of the vehicle.

* * * * *

UNITED STATES PATENT AND TRADEMARK OFFICE
CERTIFICATE OF CORRECTION

PATENT NO. : 5,080,065

DATED : Jan. 14, 1992

INVENTOR(S) : NOMURA ET AL.

It is certified that error appears in the above-identified patent and that said Letters Patent is hereby corrected as shown below:

In column 7, line 64, delete "rate may be";

In column 7, lines 65-68, delete in their entirety.

In column 8, lines 1-21, delete in their entirety;

In column 8, line 22, delete " and 120. When the slip ratio S is greater than";

In column 8, line 51, after "yaw" insert --rate may be calculated by the ECU from the difference between the rotational speeds of the right-hand and left-hand vehicle wheels which are given from rotational speed sensors 30A.

FIG. 12 shows opening and closing profiles of the intake control valves 21-24, and opening and closing profiles of inlet valves 9-12. In cases where a slip of the vehicle wheels occurs at a moment A of FIG. 12, the ECU 4 closes the intake control valve 21 for a #1 cylinder (a cylinder 5) at an

UNITED STATES PATENT AND TRADEMARK OFFICE
CERTIFICATE OF CORRECTION

PATENT NO. : 5,080,065

DATED : Jan. 14, 1992

INVENTOR(S) : NOMURA ET AL.

It is certified that error appears in the above-identified patent and that said Letters Patent is hereby corrected as shown below:

early stage by executing a slip and intake control program and by calculating a corrective factor TRTC of the equation (1).

FIG. 13 is a flowchart of the slip and intake control program. As shown in FIG. 13, a first step 100 of the program calculates the slip ratio S by referring to the equation "S=(VR-VC)/VR" where VC denotes the vehicle speed and the VR denotes the driven wheel speed. A step 110 following the step 100 compares the measured yaw rate and a desired yaw rate. A step 120 following the step 110 calculates a target slip ratio SM by referring the equation "SM=SMB-$\Delta$SM" where SMB denotes a target slip ratio for straight travel of the vehicle, and $\Delta$SM denotes a value determined by the measured yaw rate. A step 130 following the step 120 compares the slip ratios S and SM

UNITED STATES PATENT AND TRADEMARK OFFICE
CERTIFICATE OF CORRECTION

PATENT NO. : 5,080,065

DATED : Jan. 14, 1992

INVENTOR(S) : NOMURA ET AL.

It is certified that error appears in the above-identified patent and that said Letters Patent is hereby corrected as shown below:

given by the steps 100 and 120. When the slip ratio S is greater than--.

Signed and Sealed this

Twenty-first Day of September, 1993

Attest:

BRUCE LEHMAN

*Attesting Officer*  *Commissioner of Patents and Trademarks*